(12) United States Patent
Doyle, Jr.

(10) Patent No.: US 8,400,448 B1
(45) Date of Patent: **\*Mar. 19, 2013**

(54) REAL-TIME LINES-OF-SIGHT AND VIEWSHEDS DETERMINATION SYSTEM

(75) Inventor: Robert J Doyle, Jr., Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 867 days.

This patent is subject to a terminal disclaimer.

(21) Appl. No.: 12/461,350

(22) Filed: Aug. 10, 2009

Related U.S. Application Data

(63) Continuation-in-part of application No. 12/292,786, filed on Nov. 26, 2008.

(60) Provisional application No. 60/992,343, filed on Dec. 5, 2007.

(51) Int. Cl.
*G06T 15/00* (2011.01)

(52) U.S. Cl. ...................................... 345/419

(58) Field of Classification Search ........... 345/419–428
See application file for complete search history.

(56) References Cited

U.S. PATENT DOCUMENTS

| | | | |
|---|---|---|---|
| 4,865,423 A | 9/1989 | Doi | |
| 5,553,208 A * | 9/1996 | Murata et al. | 345/582 |
| 6,445,391 B1 | 9/2002 | Sowizral et al. | |
| 6,481,011 B1 * | 11/2002 | Lemmons | 725/47 |
| 6,707,464 B2 * | 3/2004 | Ham et al. | 345/629 |
| 7,079,139 B2 | 7/2006 | Smith | |
| 7,098,915 B2 * | 8/2006 | Appolloni | 345/427 |
| 7,227,544 B2 | 6/2007 | Alkouh | |
| 7,761,262 B2 * | 7/2010 | Herman et al. | 703/1 |
| 2002/0080138 A1 * | 6/2002 | Tarr | 345/441 |
| 2004/0225480 A1 * | 11/2004 | Dunham | 703/1 |
| 2005/0231530 A1 | 10/2005 | Liang et al. | |
| 2008/0049012 A1 * | 2/2008 | Bar-Joseph et al. | 345/419 |
| 2008/0074420 A1 | 3/2008 | Kuesel et al. | |
| 2008/0122834 A1 * | 5/2008 | Ouzana | 345/419 |
| 2008/0158235 A1 | 7/2008 | Bakalash et al. | |
| 2008/0246763 A1 | 10/2008 | Reshetov | |

\* cited by examiner

*Primary Examiner* — Xiao M. Wu
*Assistant Examiner* — Charles Tseng
(74) *Attorney, Agent, or Firm* — Amy L. Ressing; L. George Legg

(57) ABSTRACT

A method for processing three-dimensional data that defines a three-dimensional scene, and determining and displaying lines-of-sight (LOS) and viewsheds on all visible surfaces of the scene, includes: i) assigning at a user-selected location at least one viewpoint in the scene; ii) applying ray tracing from locations in the scene to the viewpoint to determine locations in the scene that are in a line of sight (LOS) and outside the LOS of the viewpoint, thus determining the viewshed relative to the viewpoint while generating a set of color-coding information; iv) saving the set of color-coding information as a 2D texture image in graphics hardware memory; and v) compositing the 2D texture image over the 3D scene in a 3D window at a frame rate that enables real-time updating of the color coding as the scene is translated or rotated or the viewpoint is changed.

14 Claims, 11 Drawing Sheets
(6 of 11 Drawing Sheet(s) Filed in Color)

REAL-TIME LINES-OF-SIGHT AND VIEWSHEDS DETERMINATION SYSTEM

CROSS-REFERENCE TO RELATED APPLICATIONS

This application is a continuation-in-part of U.S. application Ser. No. 12/292,786 filed Nov. 24, 2008 as a Non-Prov of Prov (35 USC 119(e)) application 60/992,343 filed on Dec. 5, 2007.

BACKGROUND OF THE INVENTION

The present invention relates generally to a method and software for rendering an image in computer and graphics hardware memory that is color-coded to indicate areas visible or not visible to observers at known locations. In particular, the present invention saves the color-coding information as a 2D texture image in graphics hardware memory and composites this 2D image over the 3D scene in the 3D window at a frame rate that enables real-time updating of the color coding as the scene is translated or rotated or the viewpoints are changed.

Previous methods for determining lines-of-sight (LOS) and viewsheds have various disadvantages.

Prior methods are limited to one sniper or viewpoint. In a combat environment there are often many snipers, look-outs, and adversaries whose viewsheds must be known. Prior systems are also limited to a stationary sniper, target, or observer. In reality, targets and snipers change positions often. Protectees and other potential targets such as vehicles move through terrain and threats need to be evaluated at every point along a route.

Prior methods require that terrain surfaces be displayed only from directly above. There is no three-dimensional view. These methods color code only surfaces visible from directly above the scene. While this is a fast technique, it provides no information about walls, doors, windows, or any vertical or near-vertical surfaces that may be within an observer's field of view.

Prior methods work only with Digital Elevation Models (DEM). These are simple elevation fields that show only the surface of a terrain (much like an inverted muffin tin). DEM's are elevation values that are obtained from directly above a terrain by aircraft or satellites. No spatial information is available for true three-dimensional features such as building interiors, tunnels, caves, or areas under trees, bridges, and overhangs.

Prior methods color code only ground surfaces that are in the direct line-of-sight from a viewpoint. This can be misleading and dangerous. This information only shows where a sniper can see the ground or the surface of a rooftop, for example. Uncolored areas may be interpreted as safe when, in fact, they may not be. For example, a sniper may not be able to see the ground surface on which a target stands but he may be able to see all of the target above his knees. Old methods do not provide this information.

Prior methods use ray tracing to show a limited number of rays emanating from a viewpoint. These are usually in one horizontal plane through the viewer's eyes. This is unsatisfactory. The entire three-dimensional field of view needs to be known.

BRIEF SUMMARY OF THE INVENTION

According to the invention, a method for processing three-dimensional data that defines a three-dimensional scene, and determining and displaying lines-of-sight (LOS) and viewsheds on all visible surfaces of the scene, includes: i) assigning at a user-selected location at least one viewpoint in the scene; ii) applying ray tracing from locations in the scene to the viewpoint to determine locations in the scene that are in a line of sight (LOS) and outside the LOS of the viewpoint, thus determining the viewshed relative to the viewpoint; and iii) color-coding every visible surface in the scene. The color coding then differentially indicates the locations in the line of sight (LOS) and outside the LOS of the viewpoint, producing a display of a color-coded viewshed relative to the viewpoint. The invention also includes the computer software, comprising source or operating code, that is operable to carry out the method, as well as the computer software product having a computer-readable medium including stored instructions that, when executed by a computer, cause the computer to carry out the method.

Old methods require the rendering of a separate image in its own window and do not permit real-time changes of the user's or the sniper's locations.

Old methods are limited to one sniper or viewpoint whereas the invention can use multiple snipers, targets, or viewpoints at the same time.

Old methods are limited to a stationary sniper, target, or observer. The invention functions with moving snipers or targets and can thus be used for convoy protection.

Old methods color code only ground surfaces visible from directly above to indicate the viewshed from a viewpoint. The invention color codes every surface in a 3D scene including roof tops, walls, under bridges and overhangs, windows, water towers, watch towers, trees and all terrain features.

Old methods show lines-of-sight and viewsheds by color coding only DEM's. The invention shows lines-of-sight and viewsheds for DEM's and for any type of three-dimensional scene. This includes features not visible in DEM's such as building interiors, vehicle interiors, tunnels, caves, and areas under bridges, overhangs, and trees.

Old methods color code only ground surfaces that are in the direct line-of-sight from a viewpoint. The invention color codes areas within a viewpoint's direct line-of-sight but also provides color-coded headroom contours. These contours show areas where, for example, a sniper cannot see the ground but can see anything taller than 1-meter or anything taller than 2-meters. Headroom contours indicate vertical cover and show walk/crawl/belly-crawl areas to plan unobserved, safe movement through a sniper's area of responsibility, for instance.

Old methods use ray tracing to show a selected but limited number of rays emanating from a viewpoint by using colored lines to show the selected number of lines-of-sight. This limits the resolution of images or animations. The invention shows every object that can be observed by the viewer in any direction and at any distance. By color coding-surfaces, it shows all viewsheds and lines-of-sight at one time. All objects viewable within a 360-degree sphere around the viewer are color-coded. The resolution of images and animations produced by the invention is limited only by the resolution of the imported 3D geometry.

Old methods do not show overlapping fields of fire or overlapping viewsheds for two or more snipers or observers. The invention uses a user-selected color to indicate regions with overlapping viewsheds from two or more snipers or observers.

In the related application for which priority is claimed (above), a separate 2D image is rendered in its own window to display color-coding of a 3D scene. The image must be re-rendered each time the scene is moved or rotated in the viewer's window or if icons representing points of view are moved, posing a problem for real-time feedback. The present invention operates at a frame rate that enables real-time updating of the color coding as the scene is translated or rotated or the viewpoints are changed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention employs ray tracing, e.g. as described in U.S. Pat. No. 4,865,423, by Akio Doi, issued Sep. 12, 1989, and in Turner Whitted, "An Improved Illumination Model for Shaded Display", Communications of the ACM, Vol. 23, No. 6, pp. 343-49 (June 1980), both of which are incorporated herein by reference. Ray tracing is also described in Rob Cook and Ken Torrance, "A Reflectance Model for Computer Graphics", *ACM Transactions on Graphics*, Vol. 1, No. 1 (January 1982), also incorporated herein by reference.

Figure 1:
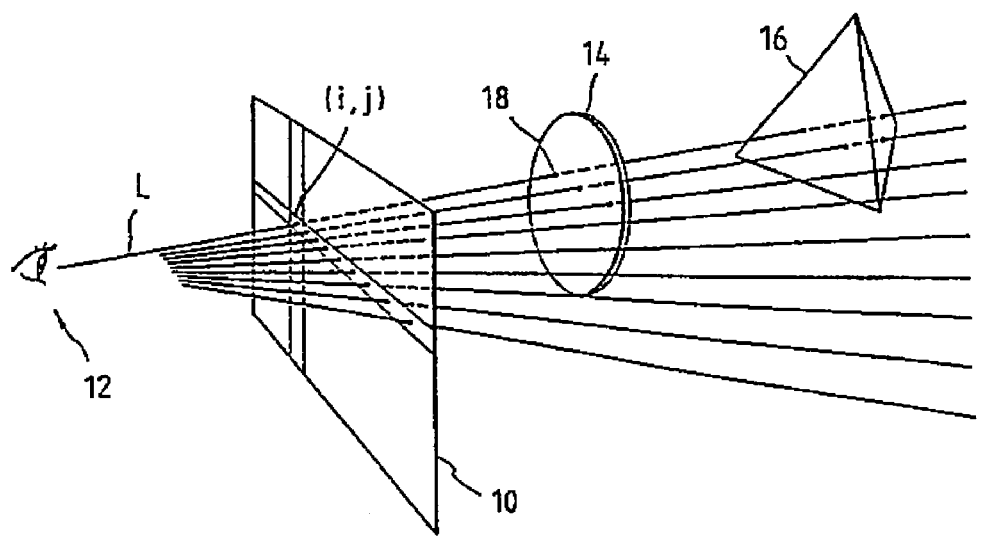
FIG. 1 is a schematic diagram of a prior art ray tracing system.

Ray tracing, shown in FIG. 1, starts with a ray L (Line of Sight, or "LOS"), emitted from a viewpoint 12, that is posited for each pixel (I,j) on screen 10 (matched with a plane of projection), and the surfaces of objects intersecting ray L are searched. Of objects 14 and 16, the first intersected by ray L and the first seen is object 14 whose intersecting surface is closer to the viewpoint.

Another description of ray tracing is found in US Patent Application No. 2008/0074420A1, published Mar. 27, 2008, and incorporated herein by reference. It describes ray tracing as a technique that traces the propagation of imaginary rays, which behave similarly to rays of light, into a three dimensional scene which is to be rendered onto a computer screen. As with the above discussion with respect to FIG. 1, the rays originate from the eyes of the viewer sitting behind the computer screen and traverse through pixels, which make up the computer screen, towards the three dimensional scene. Each ray proceeds into the scene and may intersect with objects in the scene. If a ray intersects an object within the scene, properties of the object and several other contributing factors are used to calculate the amount of color and light, or lack thereof, the ray is exposed to. These calculations are then used to determine the final color of the pixel through which the ray has passed. As will be discussed below, the invention applies a further technique of assigning pixels colors in accordance with its novel approach.

The process of tracing rays is carried out many times for a single scene. For example, a single ray may be traced for each pixel in the display. Once a sufficient number of rays have been traced to determine the color of all the pixels that make up the two dimensional synthesis of the computer screen (and again, as further modified by the invention technique), the two-dimensional scene can be displayed on the computer screen.

Figure 2:
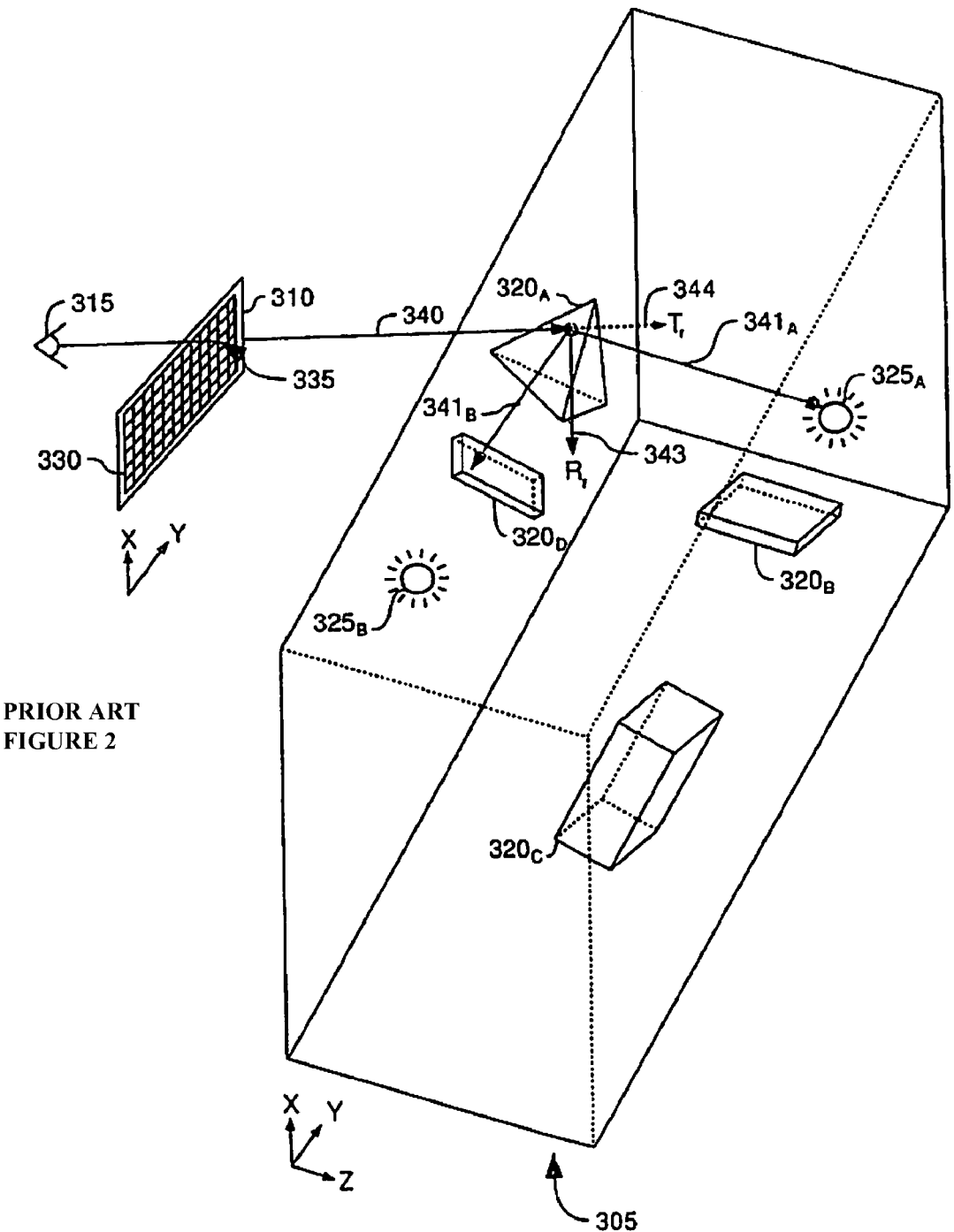
FIG. 2 is a schematic diagram of a prior art ray tracing system.

The subject reference includes a figure, included herein as FIG. 2 (and maintaining the original reference numerals of the reference), it shows a three dimensional scene 305 including objects 320 and light sources 325. Scene 305 may be rendered into a two dimensional picture by an image processing system, described further below, which may also display it on a monitor 310. Monitor 310 includes pixels 330 of different colors to render the two dimensional picture.

Ray tracing is applied by the image processing system to render the three dimensional scene into the two dimensional picture. The image processing system shoots rays 340 from the viewer 315 into the scene 305. The rays have properties and behavior similar to light rays. Ray 340 passes through a plane, represented by monitor 310, where the final two dimensional picture will be rendered by the image processing system, where pixel 335 is the point where ray 340 passes through the plane/monitor. Image processing systems employ a grid 330 of possibly millions of pixels to render the final scene on the monitor, and calculate the colors assigned to the pixels, which as already mentioned is then further refined by the technique of the invention.

One or more secondary rays 341 are issued where a primary or original ray 340 intersects an object 320. Secondary rays 341 are assigned different characteristics depending on the nature of the object or its surface and the presence or absence of other objects interfering with or otherwise obstructing the path of the secondary ray.

The invention also employs ray tracing in its system and method while utilizing a new approach, as follows.

Figure 3:
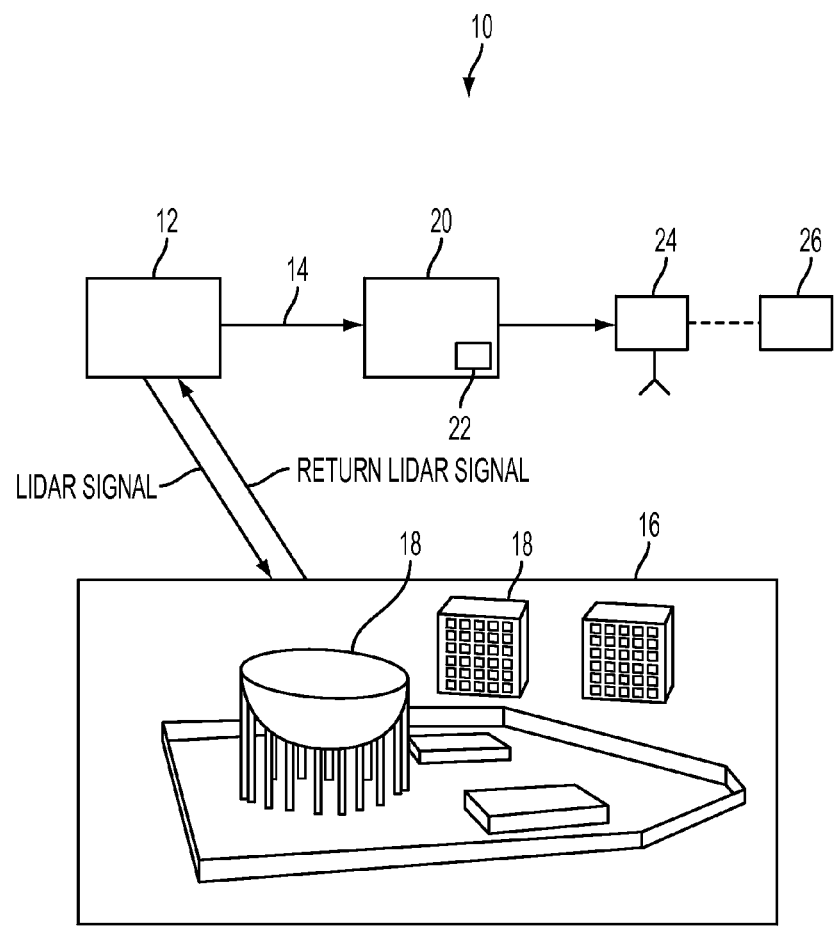
FIG. 3 is a schematic block diagram of a system to determine Lines of Sight (LOS's) and viewsheds according to the invention.

Referring now to FIG. 3, one embodiment of the invention is a LOS and viewshed determining system 10 that includes an image acquisition system 12 (e.g. a LIDAR-based system as shown) for acquiring one or more elevation fields 14 of an area 16 including three-dimensional (3D) features 18 within the area 16. Elevation fields 14 are input to a processor 20 that includes a machine-readable storage media 22 for saving and for processing the elevation fields 14 by means of the sniper detection system programmed instructions (hereinafter the "software") stored on the media 22. A monitor 24 displays the images 14 to a user, who has access to a graphical user interface (GUI) 26 with user-selectable parameters as is further described below.

Suitable data acquisition systems can include airborne-based LIDAR (Light Detection and Ranging), stereoscopic satellite imagery, and Space Shuttle radar topography data. The software is a complete visual solution for 3D data sets. Any questions concerning visual surveillance, line-of-sight, concealment, enfilade, defilade, or restricted fields of fire will be answered with color-coded imagery or animations produced by the software. The software will be deployed for both offensive and defensive operations. The software uses ray tracing for measurements within any 3D scene and is therefore very flexible.

Rays are traced by deconstructing the scene into triangles and determining which, if any, triangles are intersected by the ray and how the ray behaves if an intersection takes place. The invention uses ray tracing to determine if light is blocked by any triangle along its path. If so, part of the triangle is visible from the ray's point of origin. The region behind the triangle is not visible.

Color coding is performed for every surface in any 3D scene, including roof tops, walls, windows, vehicles, water towers, watch towers, building interiors, trees and all terrain features and objects on the terrain. All objects viewable within a 360-degree sphere around the viewer(s) are color-coded. The color-coding will indicate visible, non-visible, and nearly-visible areas as described below.

Line-of-Sight (LOS)

Figure 4:
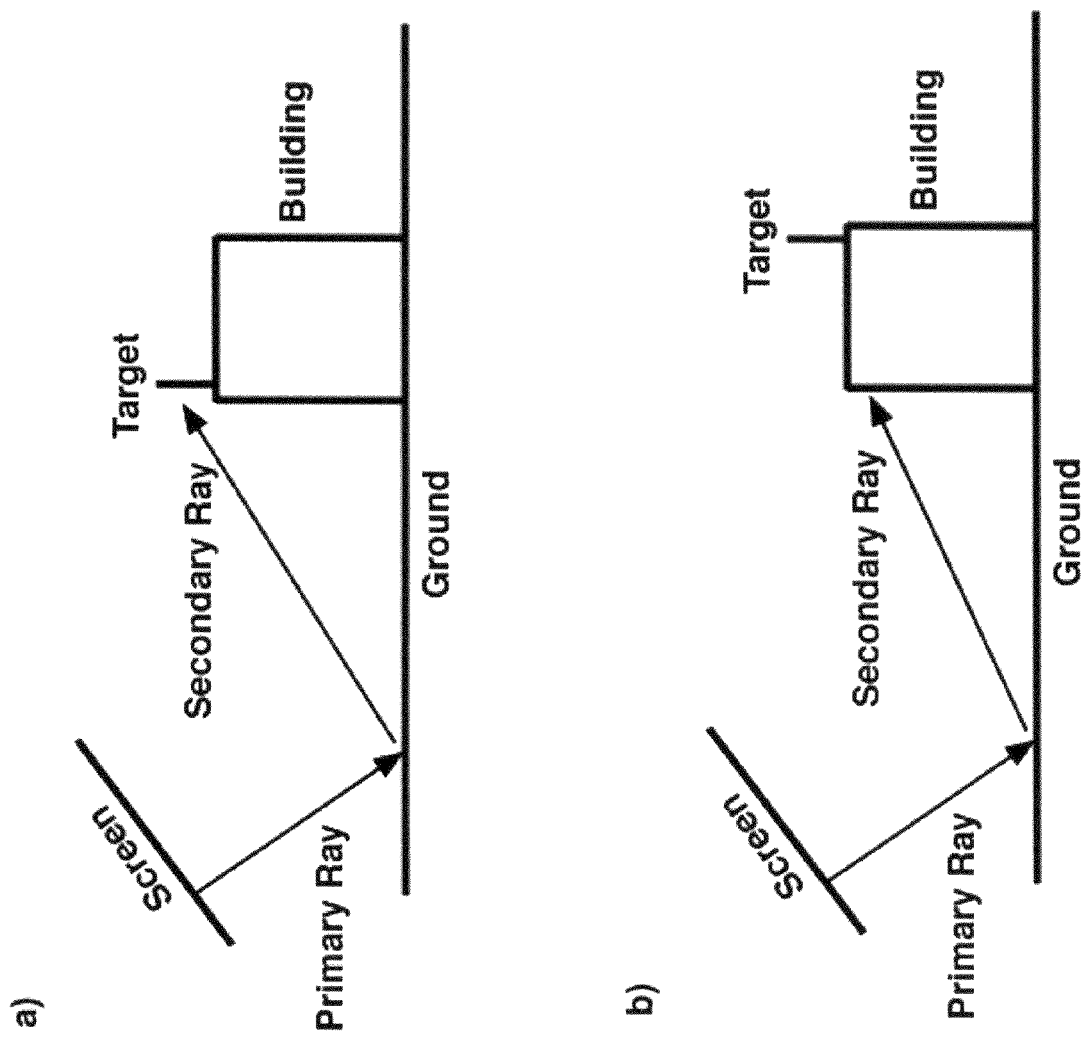
FIG. 4 is a schematic diagram of a ray tracing system according to the invention.

LOS employs the simplest type of ray tracing. Referring now to FIG. 4, the software casts a primary ray into the scene from each pixel on the screen. If the primary ray intersects the scene, secondary rays are cast toward the target, or in this case the sniper. If the secondary ray hits the target (FIG. 4a), the associated screen pixel is shaded red to indicate a direct line-of-sight to the sniper. This gives the appearance of the terrain under the pixel being shaded red. If the secondary ray collides with part of the scene before it hits the target (FIG. 4b), the screen pixel is shaded green to indicate that the sniper cannot see this area. Colors are selectable by the user.

Figure 5:
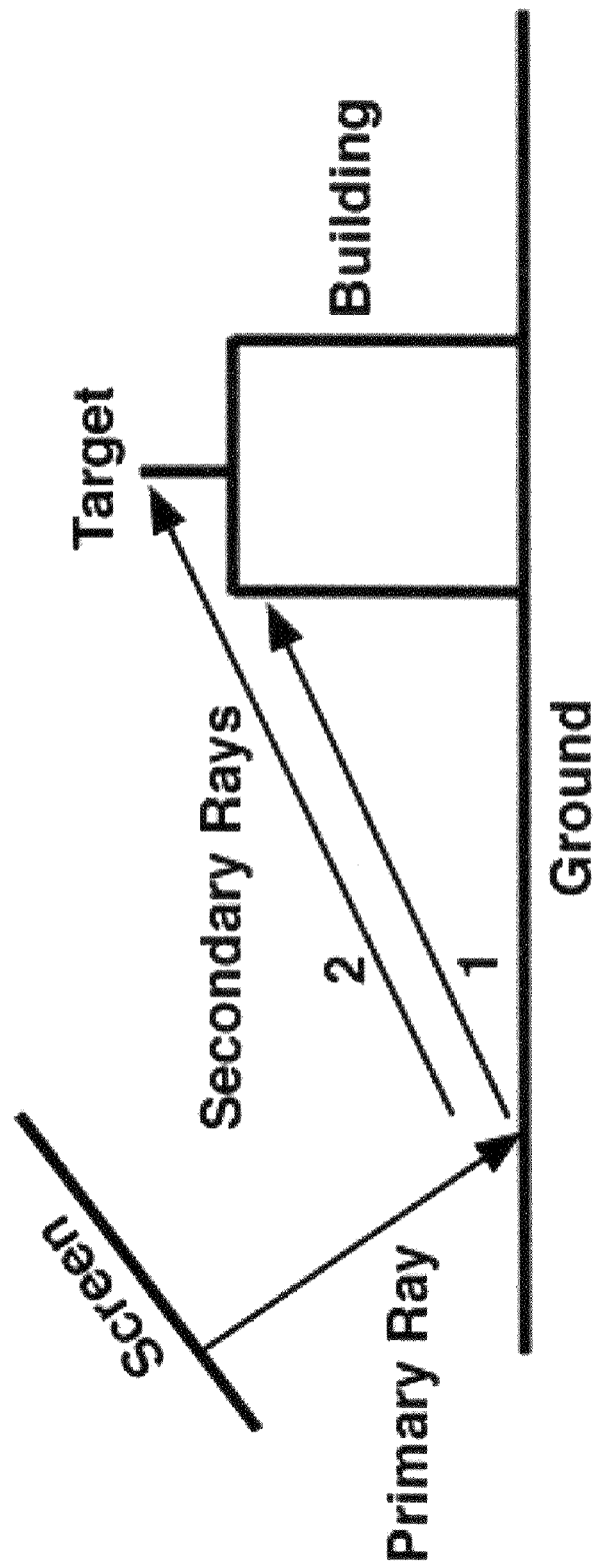
FIG. 5 is a schematic diagram of a ray tracing system according to the invention.

Referring now to FIG. 5, the software also determines headrooms, as follows. A primary ray hits a surface of the scene and a secondary ray (1) is fired at the target. If secondary ray 1 collides with a surface before hitting the target, a second secondary ray (2) will be fired from a position one-meter above the position from which ray 1 was fired. If the second secondary ray hits the target, the associated screen pixel is color-coded to indicate that a headroom of 0-1 meter exists at the point where the primary ray intersected the ground. If ray 2 had collided with a surface prior to hitting the target, a third secondary ray could be fired from a position two-meters above the position from which ray 1 was fired. Should this ray hit the target, the screen pixel will be colored to indicate that a headroom of 1-2 meters exists at the point where the primary ray intersected the ground. Secondary rays may be fired from any desired distances above the original intersection of the primary ray. As many secondary rays as desired may be fired at the target and the user can choose the colors used to indicate headrooms by means of the GUI. The software indicates all surfaces in direct line of sight to an observer or multiple observers by coloring that surface with colors selected by the user.

Figure 6:
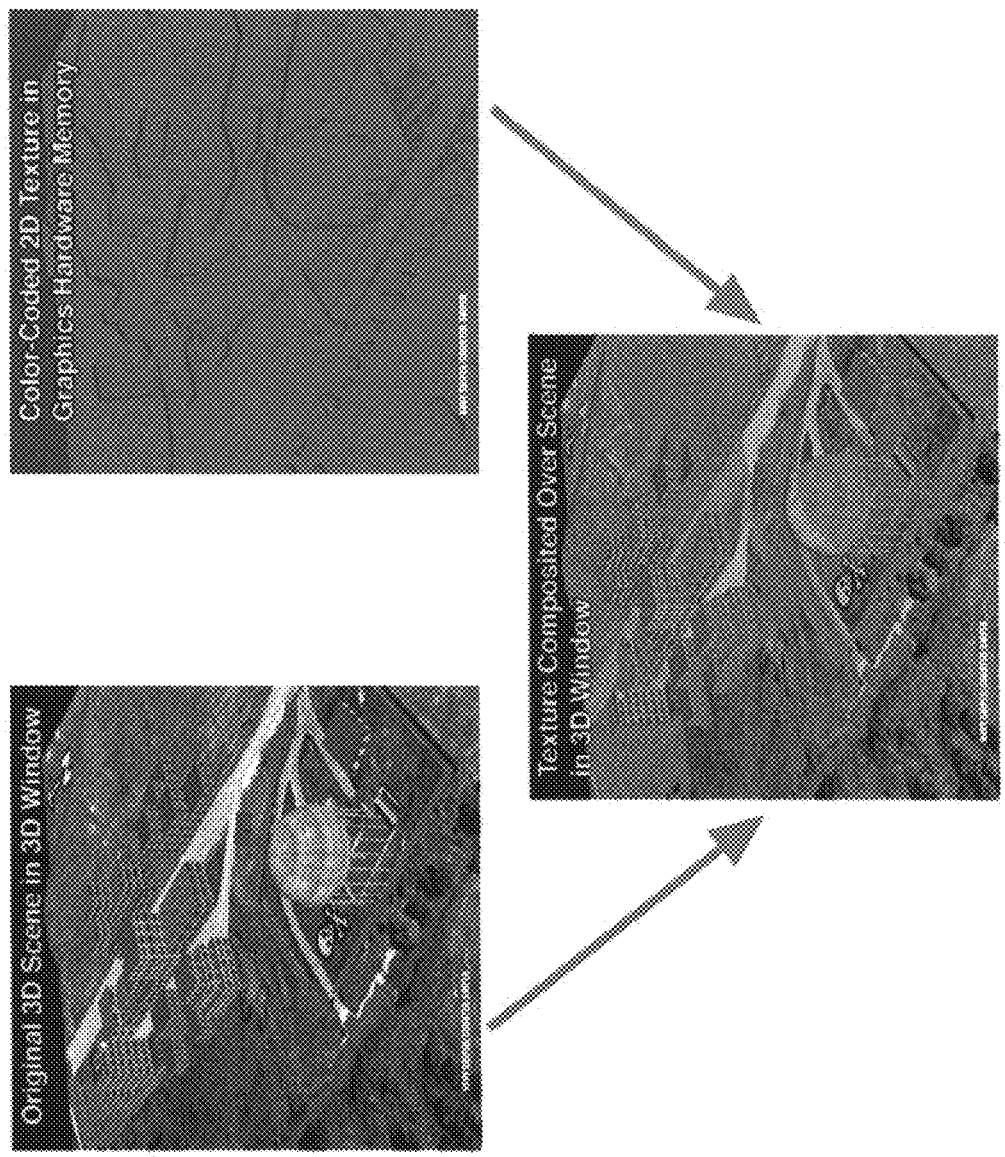
FIG. 6 shows the process by which a color-coded 2D texture in graphics memory is composited over a 3D scene in the 3D window.

FIG. 6 shows the process of the present invention by which a color-coded 2D texture in graphics memory is composited over a 3D scene in the 3D window. The invention operates in real time by rendering an image in computer graphics hardware memory that is color-coded to indicate areas visible or not visible to observers at known locations. The image contains only pre-selected colors indicating visibility; the original 3D scene is not visible. This image is then automatically composited (overlayed) on the window displaying the original 3D scene. Areas of the image that are color-coded are rendered with partial transparency so that the underlying scene can be seen. Areas that are not color-coded are completely transparent. The effect is to make the color-coding appear to be directly on the elements of the 3D scene. The speed of rendering and applying the overlay is fast enough to enable real-time feedback. For example, as an icon representing a view-point is moved across the scene, the color coding will change at the speed of the icon's movement.

Figure 7:
FIG. 7 is a representative screen display of a test 3D scene including topography and structures.
Figure 8:
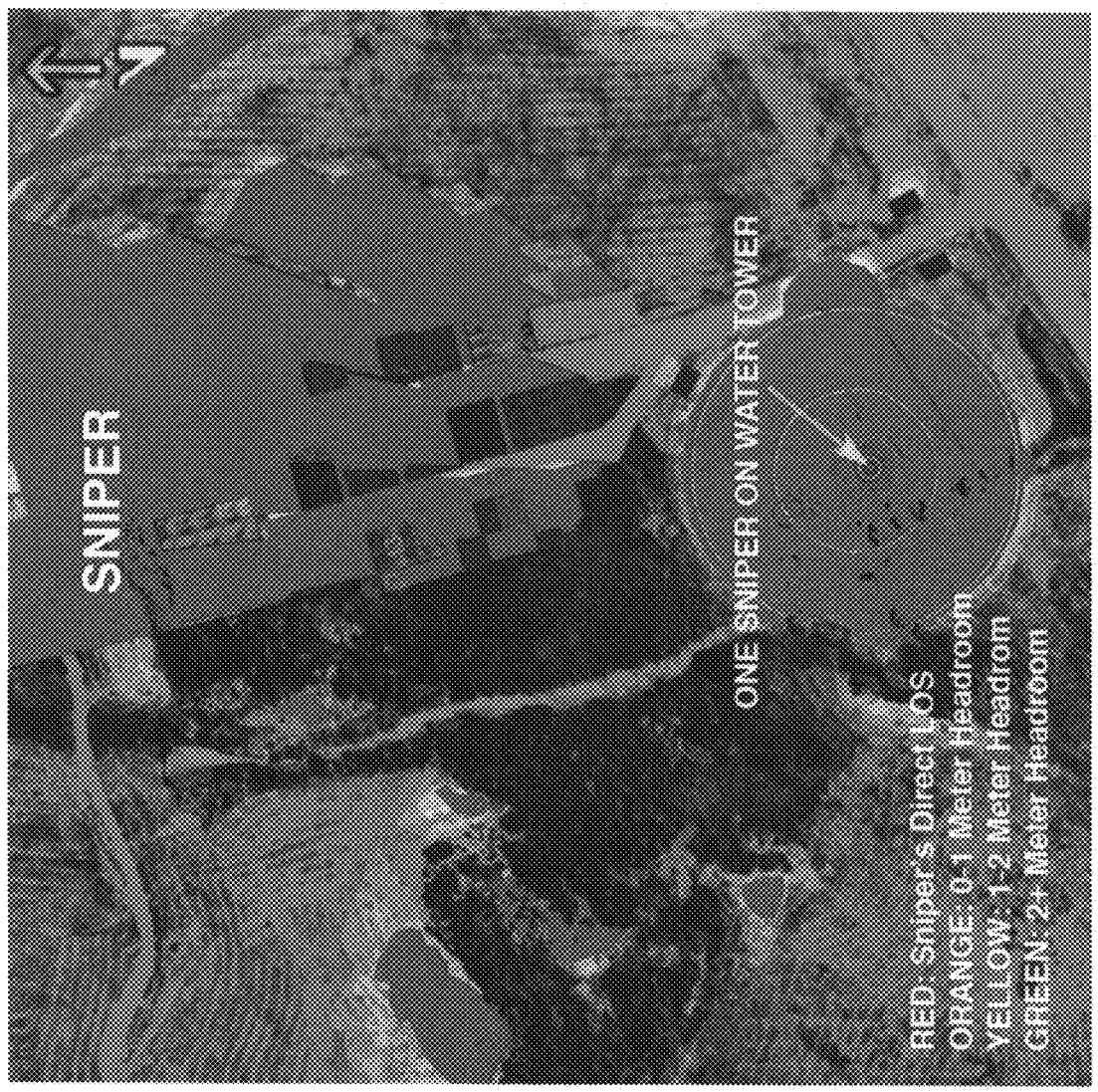
FIG. 8 shows a color-coding scheme applied to the FIG. 7 display with a sniper positioned as indicated on the water tower according to the invention.

FIG. 7 shows a representative screen display of a test database including topography and structures. FIG. 8 shows a color-coding scheme according to the invention applied to FIG. 7, with a sniper positioned as indicated on the water tower. It can be seen that a major feature of the software is the color-coded indication of safe headroom contours, otherwise known as vertical cover, with the different colors applied to indicate the areas of coverage with respect to the sniper, as follows: a sniper's direct line of sight (LOS)—red; 0-1 meter headroom—orange; 1-2 meter headroom—yellow; and 2+ meter headroom—green, these headroom colors thereby indicating walk, crawl, or belly-crawl areas which can be used to plan unobserved movement through a sniper's or an observer's area of responsibility (AOR). The latter movements would be just below the sniper's LOS.

Multiple Snipers or Observers

Figure 9:
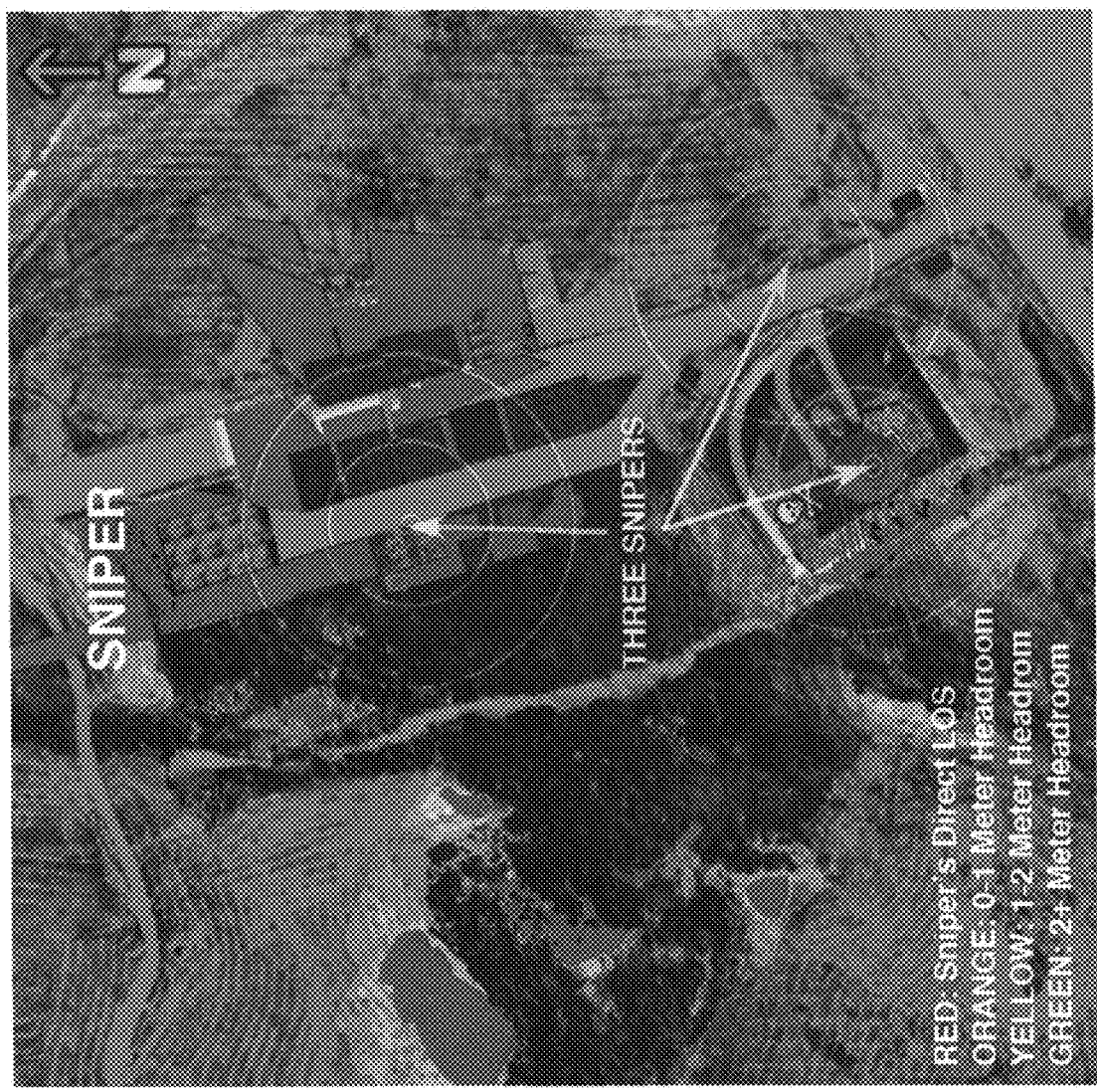
FIG. 9 shows a 3D scene as in FIG. 7 and with three snipers according to the invention.
Figure 10:
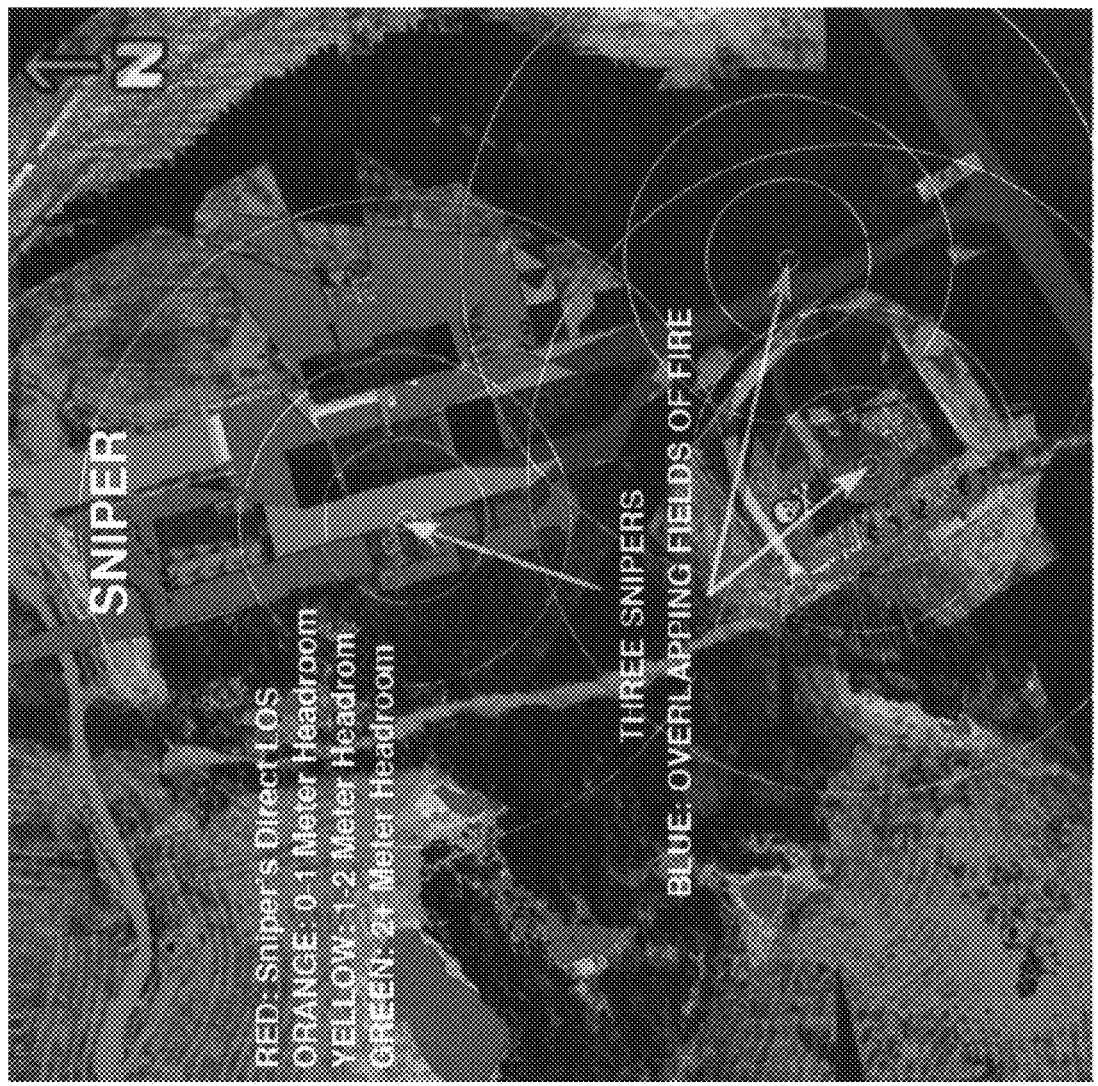
FIG. 10 is a shows the same scene as in FIGS. 7-9 with the optional color-coding that is enabled to show overlapping fields of fire from two or more snipers according to the invention.

The software can use an multiple snipers, targets, or view-points at the same time. FIG. 9 shows a 3D scene as in FIGS. 7-8 but with three snipers positioned as shown, and with the results as indicated, where the overall LOS area in red is much greater with concomitant decreases in available headroom for seeking cover from the three snipers. FIG. 10 shows the same scene with the optional color-coding that is enabled to show overlapping fields of fire from two or more snipers. Overlapping fields of fire may be shown for any number of snipers or observers. Similarly, the fields of view of guards in watch-towers are color-coded for force protection of fixed compounds.

This is similar to LOS ray tracing. The software casts a primary ray into the scene from each pixel on the screen. If a primary ray intersects the scene, secondary rays will be cast from the point of intersection toward each target in turn, or in this case each sniper. If any secondary ray hits any sniper, the screen pixel is shaded red. This gives the appearance of the terrain under the pixel being shaded red. If all of the second rays collide with part of the scene before they hit the sniper, the screen pixel is shaded green. If several secondary rays hit sniper icons, that pixel will be shaded the color that indicates overlapping fields of fire (or overlapping fields of view), in this case blue.

Range Rings

FIGS. 9 and 10 also include range rings from selected snipers. The software automatically draws range rings for line-of sight distances or level distances. Range rings are drawn by determining the distance from the intersection point of a primary ray to the target or sniper. If the distance is equal to a preselected range ring distance the screen pixel will be colored white (or any selected color). This gives the appearance of the terrain under the pixel being shaded white, in these figures. When the scene is completely rendered, all pixels that correspond to selected distances will be white, giving the appearance of circles around a target.

3D Data Sets

Figure 11:
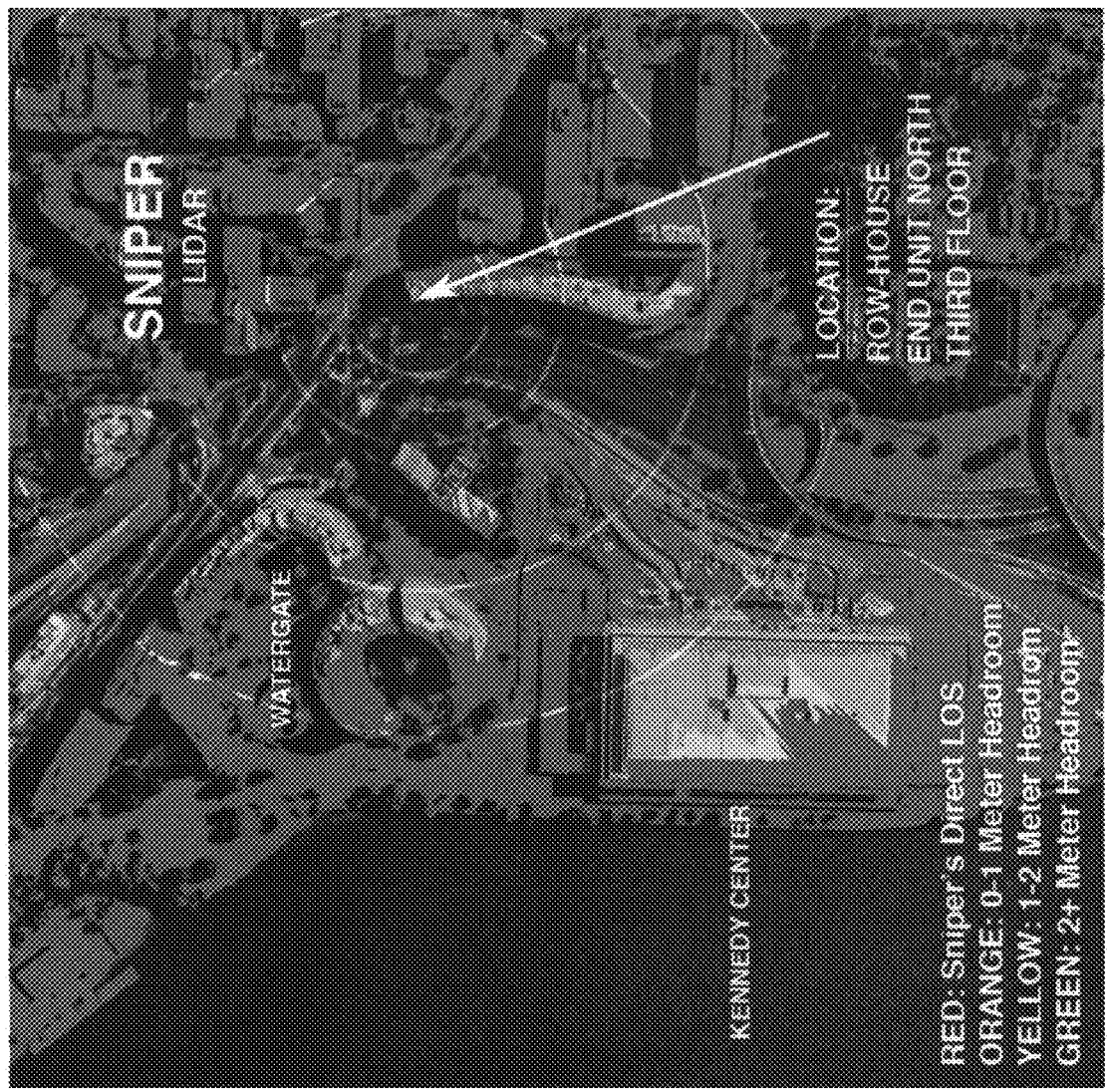
FIG. 11 shows a color-coded image produced from LIDAR (Light Detection and Ranging) data according to the invention.

The software works with any kind of 3D data set. FIG. 11 shows a color-coded image produced by the software from LIDAR data. In addition, 3D scenes are created by using stereoscopic satellite imagery.

In summation, besides sniper and counter-sniper operations, these applications are designed for direct-action mission planning, law enforcement SWAT operations, covert ingress and egress, special-reconnaissance planning, route planning for convoys or protectees, and general force protection. Intelligence products include multiple-viewpoint imagery, animations of routes, large overlay images or maps, and color-coded 3D geometry and textures (i.e.: OpenFlight export). Civilian applications include LOS and viewshed determination for architectural plans, construction projects, guard towers, the positioning of video surveillance cameras, and highway planning.

It should be noted that the LOS and viewshed determining method of the present invention can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

For example, a field agent with a laptop running the Software can, by means of mobile-to-mobile radios, a prearranged hand signal convention, or other standard field communication means, alert other agents to take cover outside a sniper's viewshed and/or to determine suitable positions from which to either target a sniper position, e.g. to assume a sniper position in order to cover a convoy or a target of interest.

The Software is currently a stand-alone software application and uses software libraries known as OpenSceneGraph.

Thus, while the present invention has been described with respect to exemplary embodiments thereof, it will be understood by those of ordinary skill in the art that variations and modifications can be effected within the scope and spirit of the invention.

What is claimed as new and desired to be protected by Letters Patent of the United States is:

1. A computer software product for processing a three-dimensional scene, and determining and displaying lines-of-sight (LOS) and viewsheds in the scene, the product comprising a physical computer-readable medium including stored instructions that, when executed by a computer, cause the computer to:
   i) assign at a user-selected location at least one viewpoint in the scene;
   ii) apply ray tracing from locations in the scene to the viewpoint to determine locations in the scene that are in a line of sight (LOS) and outside the LOS of the viewpoint and thereby determining the viewshed relative to the viewpoint;
   iii) color-code the scene whereby the color coding differentially indicates the locations in the line of sight (LOS) and outside the LOS of the viewpoint, thereby displaying a color-coded viewshed relative to the viewpoint;
   iv) save the set of color-coding information as a 2D texture image in graphics hardware memory;
   v) composite the 2D texture image over the 3D scene in a 3D window at a frame rate that enables real-time updating of the color coding as the scene is translated or rotated or the viewpoint is changed; and
   vi) operate a graphical user interface (GUI) that includes a user-selected color-coding scheme for a display of safe headroom contours by coloring surfaces that have a near line of sight to an observer or multiple observers when rays are originated from points above said surfaces while differentially-coloring surfaces that are not in the direct line of sight whereby the safe headroom contours reveal whether people positioned on said surfaces can be seen by an observer.

2. The computer software product of claim 1, wherein the instructions for the GUI include the user-selecting range rings.

3. A system for acquiring three-dimensional data that defines a three-dimensional scene, and determining and displaying lines-of-sight (LOS) and viewsheds on all visible surfaces of the scene, comprising:
   means for acquiring the three-dimensional data that includes data defining at least one elevation field of the scene with three-dimensional (3D) features within the scene;
   a processor for receiving the elevation field data comprising a machine-readable storage media including stored instructions that, when executed by the processor, cause the processor to:
      i) assign at a user-selected location at least one viewpoint in the scene;
      ii) apply ray tracing from locations in the scene to the viewpoint to determine locations in the scene that are in a line of sight (LOS) and outside the LOS of the viewpoint and thereby determining the viewshed relative to the viewpoint;
      iii) color-code the scene whereby the color coding differentially indicates the locations in the line of sight (LOS) and outside the LOS of the viewpoint, thereby displaying a color-coded viewshed relative to the viewpoint;
      iv) save the set of color-coding information as a 2D texture image in graphics hardware memory;
      v) composite the 2D texture image over the 3D scene in a 3D window at a frame rate that enables real-time updating of the color coding as the scene is translated or rotated or the viewpoint is changed; and
      vi) operate a graphical user interface (GUI) that includes a user-selected color-coding scheme for a display of safe headroom contours by coloring surfaces that have a near line of sight to an observer or multiple observers when rays are originated from points above said surfaces while differentially-coloring surfaces that are not in the direct line of sight whereby the safe headroom contours reveal whether people positioned on said surfaces can be seen by an observer; and
   a monitor for displaying the color-coded viewshed and scene, whereby a decision based on the color-coded viewshed may be made and implemented in a desired application.

4. The system of claim 3, wherein the instructions include displaying the viewpoint as that of a sniper positioned in the scene.

5. The system of claim 4, wherein the instructions include positioning multiple snipers in the scene and for the color-coding to indicate a viewshed relative to each of the multiple snipers.

6. The system of claim 5, wherein the instructions include indicating overlapping fields of fire or views from two or more snipers or observers.

7. The system of claim 3, wherein the instructions for the GUI include the user-selecting range rings.

8. The system of claim 3, wherein the application is personnel security protection.

9. The system of claim 3, wherein the application is convoy protection.

10. The system of claim 3, wherein the application is effectively positioning one or more snipers.

11. The system of claim 3, wherein the application is covert ingress and egress.

12. The system of claim 3, wherein the application is a construction project.

13. The system of claim 3, wherein the application is highway planning.

14. The system of claim 3, wherein the application is the positioning of video surveillance cameras.

\* \* \* \* \*